United States Patent Office 3,584,109
Patented June 8, 1971

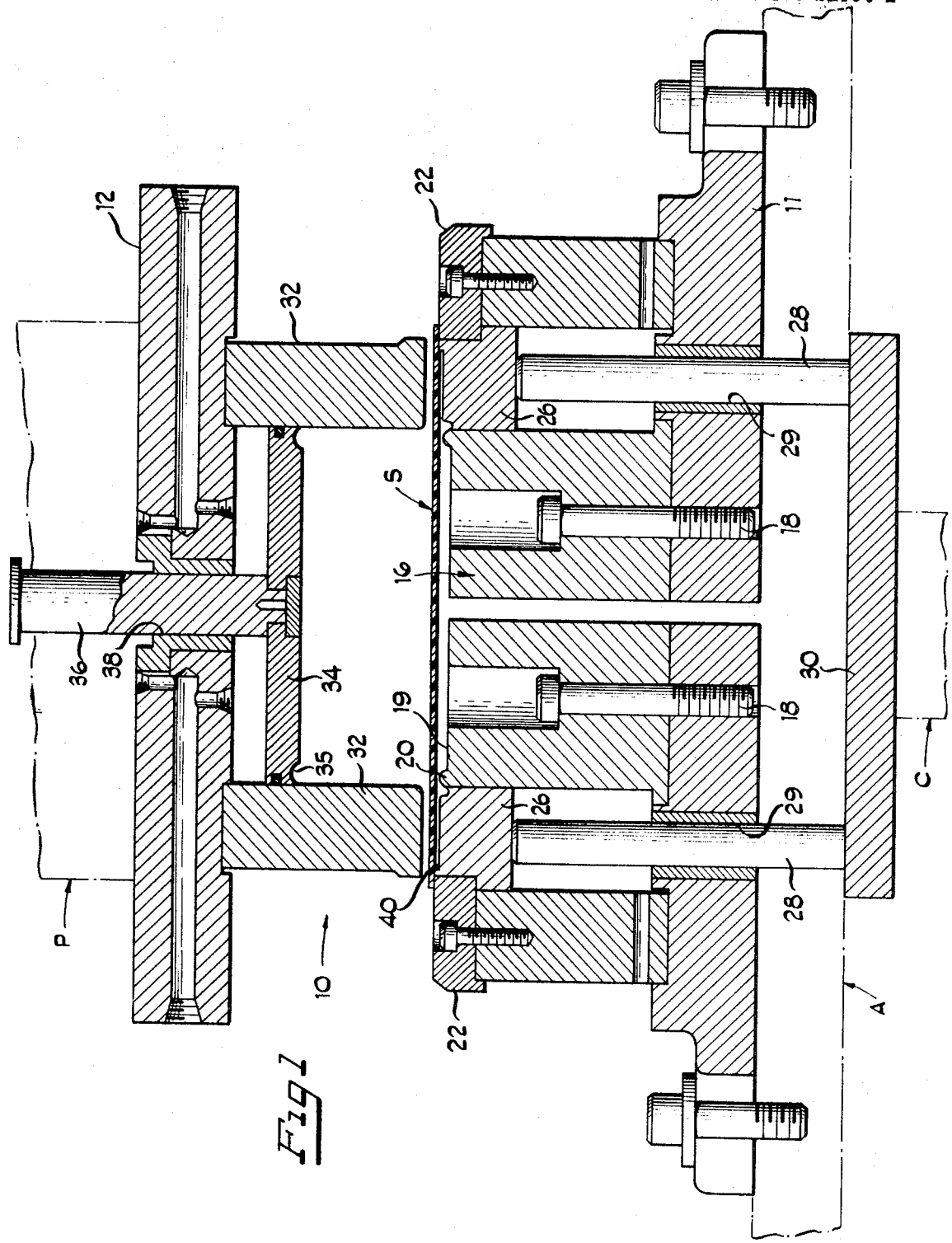

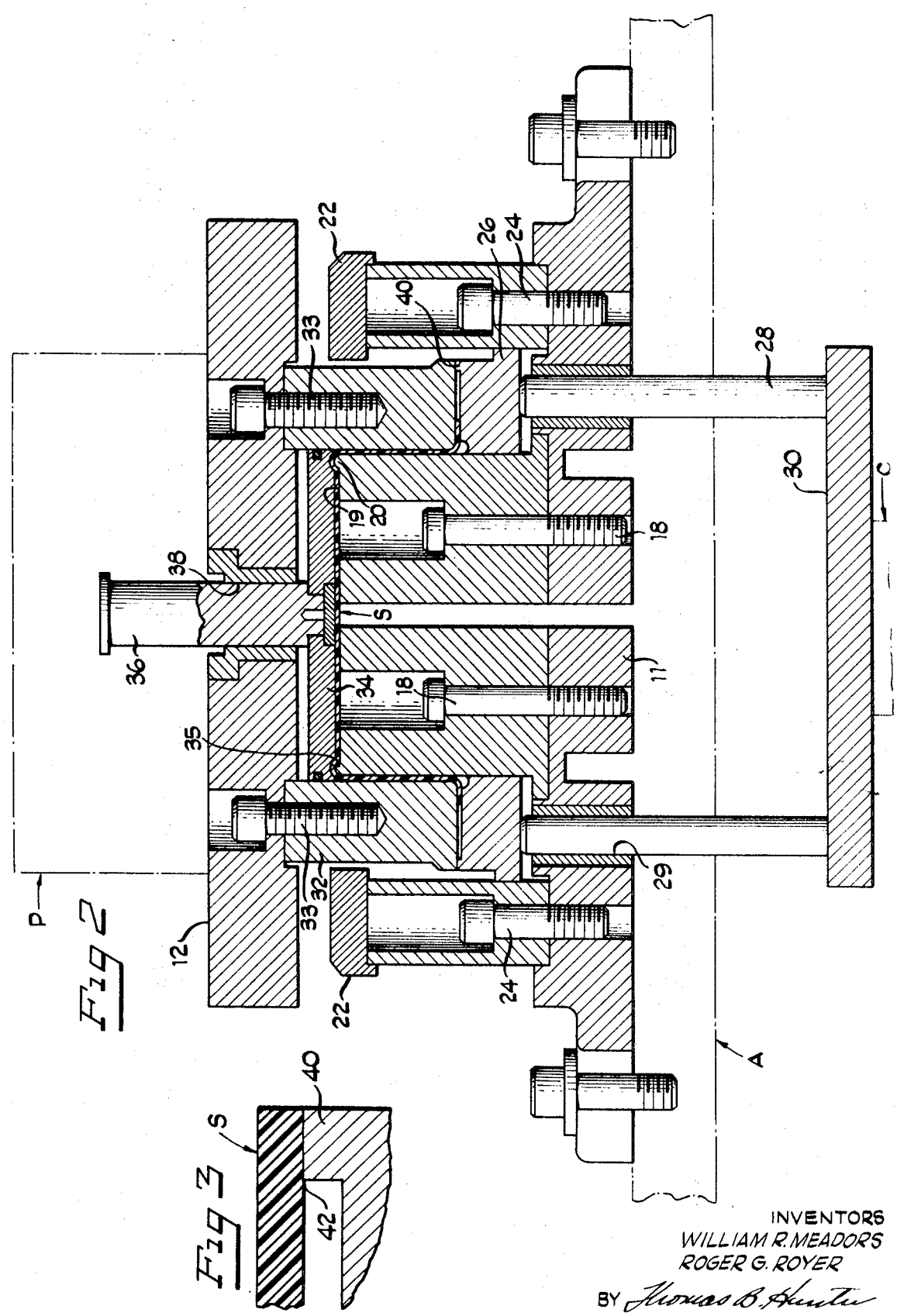

3,584,109
DRAWING METHOD
William R. Meadors, Washington, and Roger G. Royer, Parkersburg, W. Va., assignors to Borg-Warner Corporation, Chicago, Ill.
Original application Apr. 10, 1967, Ser. No. 629,763. Divided and this application Sept. 16, 1968, Ser. No. 802,300
Int. Cl. B29c 17/03
U.S. Cl. 264—292
2 Claims

ABSTRACT OF THE DISCLOSURE

A method for drawing or cold forming plastic sheet material by applying a relatively high load, on the order of 1500–4000 p.s.i., to the peripheral area of the blank during the initial stages of the draw; and as the drawing continues, reducing the loading to about 300–600 p.s.i. The area to which the initial high loading is applied is 5–15 percent of the entire blank surface. In carrying out the method described, articles produced have greater dimensional stability; and the tear strength, especially around the lip of the drawn article, is significantly higher.

SUMMARY AND BACKGROUND OF THE INVENTION

This is a division of application Ser. No. 629,763, filed Apr. 10, 1967, now abandoned.

This invention relates to improvements in cold forming or drawing sheet materials, and more particularly to a method for increasing the dimensional stability and tear strength of the lip of articles formed in accordance therewith.

While the art of drawing metal is very highly developed, many special problems are involved in the more recently developed technology relating to the drawing of thermoplastic sheet materials. Because plastic materials capable of being drawn have significantly different physical properties than metal, such as aluminum or steel, it has been hard to draw plastic articles with good dimensional stability and tear strength, particularly in and around the lip of the drawn article. Problems have also been encountered with wrinkling and fraying of the peripheral flange which is formed around the mouth or open end of the article during the draw. When this occurs, it is difficult to trim the flange evenly to obtain a neat appearing article.

The present invention, which relates to an improved process, is capable of accomplishing these objectives to a degree which is not possible using the methods described in the prior art. Essentially, the process comprises the steps of first applying a relatively high loading force on the peripheral area of the blank to be drawn, and then reducing this pressure rather abruptly at some intermediate position during the drawing stroke. While the principle involved is not completely understood, it is believed that the high pressure at the initial stages of the draw produces some molecular reorientation of the plastic and results in an article having a lip tear strength much greater than those capable of being produced by prior art processes. In addition to the increased tear strength, the dimensional stability of the article is much greater, because the strength of the lip area is one of the main factors which determines the overall structural integrity of the article.

Accordingly, it is a principal object of the invention to provide a novel process of cold forming or drawing thermoplastic sheet material.

Still another object of the invention is to provide articles having relatively high tear strength around the lip portion thereof an darticles having greater overall dimensional stability.

Additional objects and advantages will be apparent from the following detailed description taken in conjunction with the drawings.

THE DRAWINGS

FIG. 1 is a cross-sectional view of a preferred apparatus for performing the invention, said view showing the upper and lower die members in the open position before blanking;

FIG. 2 is a cross-sectional view similar to FIG. 1 with the upper and lower die members in the closed position after blanking; and FIG. 3 is a detailed cross-sectional view of a portion of the draw pad.

DESCRIPTION

Referring first to FIG. 1, the die assembly designated generally at 10 comprises a lower die base 11 and an upper die base 12, said lower die base being mounted on a rigid platform or press bed indicated generally at A. The upper die base is reciprocally carried by the movable portion of a conventional press indicated generally at P, such press being well known in the art and not requiring a more detailed description inasmuch as it forms no part of the present invention. It is further understood that either the upper or the lower die bases may be mounted for movement with respect to the other.

The lower die base 11 supports a male die member or punch 16 which is fixedly mounted to the base 11 by means of cap screws 18 or other suitable means. The nose 19 of punch 16 is provided with a raised lip 20 along its peripheral portion which will be described in more detail below.

Surrounding the punch and spaced therefrom is an annular shear or blanking ring 22 which is also secured to the die base by cap screws 24. Between the shear ring 22 and the punch is an annular draw pad 26 which is movable with respect to the punch and supported by a plurality of pressure or draw pad pins 28 extending up through openings 29 in the lower die base. The other end of each of said pressure pins contacts an air cushion pressure pad 30 underneath the lower die base. The pressure pad, in turn, is operatively associated with an air cushion or springs generally designated at C, the construction of which is understood in the art and does not require a more detailed description.

The upper die base 12, as carried on the press P, is mounted for reciprocal movement with respect to the punch, said upper die base carrying the female die element or die 32 by cap screws 33. Resiliently mounted on the upper die base 12 is a knock-out pad 34 which also serves a "coining" function. The knock-out pad is carried by a guide pin 36 which extends through a bushing 38 in the upper die base.

As pointed out in the Summary, the primary object of the invention is to apply a relatively high load force at the peripheral area of the blank and then relieve this pressure during the drawing process. As best shown in FIG. 3, this is accomplished by providing a peripheral shoulder 40 on the upper surface of the draw pad, the height of said shoulder being approximately 15–25 percent less than the thickness of the sheet material being drawn. For example, if the material to be drawn is 0.015 in., the shoulder height would be in the range of 0.010 to 0.012 in. The width of the shoulder is selected so that the area over which the high pressure is initially applied is approximately 5–15 percent of the surface area of the blank.

The plastic sheet material S is placed over the punch and draw pad so that it rests on the shoulder 40. When the drawing stroke is initiated, the die 32 is brought down on top of the sheet material so that it engages the peripheral area lying over the shoulder. The high loading, on the order of 1500–4000 p.s.i., is thus confined to this shoulder; and as the die is moved further with respect to the punch, the plastic material begins to flow from the shoulder to the area immediately adjacent to the shoulder across the edge 42 (FIG. 3).

Initially the upper die base 12 and the lower die base 11 are in the position shown in FIG. 1. A sheet of plastic material S is laid over the center of the lower die member or punch 16 so that it rests on and over the shoulder 40 on the draw pad, thus providing a small air gap between the sheet material and the remaining surface of the draw pad inside the shoulder. The upper die base 12 is moved relative to the punch so that the material is first contacted by die 32 over the shoulder of the draw pad; and as the drawing continues, the draw pad is moved along with the die and the material is pulled radially inwardly across the edge 42 of the shoulder. When the peripheral area of the sheet material has been drawn off the shoulder 40, the loading on the peripheral area of the material is reduced to approximately 300 to 600 p.s.i. The shear ring 22 also cuts the blank during the initial movement of the die relative to the punch. At an intermediate position, the knock-out pad engages the material lying over the nose of punch 16 and the complementary groove 35 cooperates with lip 20 to effect a coining operation over the base of the article. Both the knock-out pad 34 and the die 32 begin to move relative to each other at this point until they reach the final position, illustrated in FIG. 2. When the press is raised, the article is lifted up by the air cushion along with the draw pad and the die.

While this invention has been described with a certain specific embodiment thereof, it is to be understood that this is by way of illustration and not by way of limitation; and the scope of the appended claims should be construed as broadly as the prior art will permit.

What is claimed is:

1. A method of drawing thermoplastic sheet material comprising the steps of: placing one side of a blank of such material in engagement with a draw pad having a shoulder adapted to support said blank at a peripheral area thereof comprising about 5 to 15% of the entire surface area of said blank; applying a load of approximately 1500 to 4000 p.s.i. around said peripheral area by engaging the other side of said blank with a female die member; engaging said one side of said blank with a male die member complementary to said female die member and surrounded by said draw pad; and reducing the pressure applied to approximately 300 to 600 p.s.i. by effecting relative movement between said male die member and said female die member to draw said blank off said shoulder.

2. The method as defined in claim 1 wherein the height of said shoulder is approximately 15 to 25% less than the thickness of said sheet material.

References Cited

UNITED STATES PATENTS

| | | | |
|---|---|---|---|
| 2,518,565 | 8/1950 | Nicolle | 18—19P |
| 3,279,780 | 10/1966 | Williamson | 72—351X |
| 3,349,153 | 10/1967 | Beck | 264—89 |

ROBERT F. WHITE, Primary Examiner

J. H. SILBAUGH, Assistant Examiner

U.S. Cl. X.R.

18—19; 264—323